US011225950B2

(12) United States Patent
Baun et al.

(10) Patent No.: US 11,225,950 B2
(45) Date of Patent: Jan. 18, 2022

(54) MULTIROTOR WIND TURBINE (71) Applicant: Vestas Wind Systems A/S, Aarhus N. (DK)

(72) Inventors: Torben Ladegaard Baun, Skødstrup (DK); Brian Jørgensen, Galten (DK); Per Holten-Møller, Silkeborg (DK); Jonas Lerche Schomacker, Solrød Strand (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 17/059,703

(22) PCT Filed: Jun. 14, 2019

(86) PCT No.: PCT/DK2019/050189
§ 371 (c)(1),
(2) Date: Nov. 30, 2020

(87) PCT Pub. No.: WO2019/238193
PCT Pub. Date: Dec. 19, 2019

(65) Prior Publication Data
US 2021/0372376 A1  Dec. 2, 2021

(30) Foreign Application Priority Data

Jun. 15, 2018  (DK) ............................ PA 2018 70409

(51) Int. Cl.
*F03D 80/80* (2016.01)
*F03D 1/02* (2006.01)
(Continued)

(52) U.S. Cl.
CPC ................ *F03D 80/88* (2016.05); *A62B 5/00* (2013.01); *E04G 3/24* (2013.01); *F03D 1/02* (2013.01);
(Continued)

(58) Field of Classification Search
CPC . F03D 80/88; F03D 1/02; F03D 13/20; A62B 5/00; E04G 3/24; E06C 9/02; F05B 2270/107; F05B 2270/80
(Continued)

(56) References Cited

U.S. PATENT DOCUMENTS 2,511,023 A * 6/1950 Thomas ................. F03D 13/20
52/40
5,429,480 A * 7/1995 Van Der Veken ...... F03D 80/70
416/120

(Continued)

FOREIGN PATENT DOCUMENTS

DE  102006034299 A1  1/2008
DE  102010055873 A1  6/2012
(Continued)

OTHER PUBLICATIONS

Weston, David. First power from Vestas four-rotor concept. Jul. 4, 2016. https://www.windpowermonthly.com/article/1401013/first-power-vestas-four-rotor-concept (Year: 2016).*
(Continued)

*Primary Examiner* — Mark A Laurenzi
*Assistant Examiner* — Mickey H France
(74) *Attorney, Agent, or Firm* — Wood Herron & Evans LLP (57) ABSTRACT A multirotor wind turbine (1) comprising a vertical tower and at least two energy generating units (5), a load carrying structure (9, 10) extending transverse to the vertical direction and carrying the at least two energy generating units (5); and at least one escape route extending between a start and an exit. To provide a safe escape route, the load carrying structure forms at least a first section of the escape route from the start to an intermediate location, and the wind turbine comprises an escape opening in the nacelle, the
(Continued)

escape opening leading from an interior space of a nacelle of the energy generating unit to a passage structure and the passage structure extending from the escape opening to the start of the escape route.

19 Claims, 6 Drawing Sheets

(51) Int. Cl.
*F03D 13/20* (2016.01)
*A62B 5/00* (2006.01)
*E04G 3/24* (2006.01)
*E06C 9/02* (2006.01)

(52) U.S. Cl.
CPC ............... *F03D 13/20* (2016.05); *E06C 9/02* (2013.01); *F05B 2270/107* (2013.01); *F05B 2270/80* (2013.01)

(58) Field of Classification Search
USPC ................. 415/905, 2.1–4.5; 290/42, 53; 416/132 B, 196 A
See application file for complete search history.

(56) References Cited

U.S. PATENT DOCUMENTS

| | | | | |
|---|---|---|---|---|
| 5,876,181 | A * | 3/1999 | Shin | F03D 15/10 415/2.1 |
| 7,075,189 | B2 * | 7/2006 | Heronemus | F03D 9/255 290/44 |
| 9,803,616 | B2 * | 10/2017 | Port | F03D 7/0224 |
| 2009/0220342 | A1 * | 9/2009 | Wu | F03D 1/02 416/124 |
| 2010/0289269 | A1 * | 11/2010 | Christy | F24S 25/10 290/55 |
| 2010/0296928 | A1 * | 11/2010 | Falcone | F03D 13/10 416/120 |
| 2011/0080004 | A1 * | 4/2011 | Hadi | F03D 9/255 290/55 |
| 2011/0302879 | A1 * | 12/2011 | Baker | F03D 13/10 52/745.17 |
| 2012/0263602 | A1 * | 10/2012 | Booth | F03D 80/50 416/244 R |
| 2012/0298793 | A1 * | 11/2012 | Weddendorf | F03D 1/02 244/17.23 |
| 2013/0127173 | A1 * | 5/2013 | Lee | F03D 13/20 290/55 |
| 2014/0105721 | A1 * | 4/2014 | Koko | F03D 1/04 415/1 |
| 2014/0217238 | A1 * | 8/2014 | Jakubowski | F03D 80/00 244/114 R |
| 2015/0050143 | A1 * | 2/2015 | Kammer | F03D 17/00 416/1 |
| 2015/0115614 | A1 * | 4/2015 | Smith | F03D 15/00 290/1 C |
| 2016/0010627 | A1 * | 1/2016 | Austin | F03D 13/20 290/55 |
| 2017/0292497 | A1 * | 10/2017 | Asfar | F03D 15/00 |
| 2018/0045179 | A1 * | 2/2018 | Hong | F03D 7/0204 |
| 2018/0128244 | A1 * | 5/2018 | Lu | F03D 13/20 |
| 2018/0149135 | A1 * | 5/2018 | Lam | F03D 3/0427 |
| 2018/0363622 | A1 * | 12/2018 | Baun | F03D 1/02 |
| 2018/0363631 | A1 * | 12/2018 | Neubauer | F03D 1/02 |
| 2019/0211804 | A1 * | 7/2019 | Siegfriedsen | F03D 13/25 |
| 2020/0208611 | A1 * | 7/2020 | Shi | F03D 9/25 |

FOREIGN PATENT DOCUMENTS

| | | | |
|---|---|---|---|
| DE | 102012020052 B3 * | 4/2014 | ............ F03D 13/22 |
| EP | 2505541 A1 | 10/2012 | |
| EP | 2686550 A1 | 1/2014 | |
| KR | 101400201 B1 | 5/2014 | |
| WO | 2015078480 A1 | 6/2015 | |
| WO | 2017108057 A1 | 6/2017 | |
| WO | 2017178026 A1 | 10/2017 | |

OTHER PUBLICATIONS

Danish Patent and Trademark Office, Search and Examination Report in PA 2018 70409, dated Dec. 4, 2018.
European Patent Office, International Search Report and Written Opinion in PCT Application No. PCT/DK2019/050189, dated Sep. 10, 2019.

\* cited by examiner

MULTIROTOR WIND TURBINE

INTRODUCTION

The disclosure relates to a multirotor wind turbine comprising a tower extending in a vertical direction from a tower bottom to a tower top. The wind turbine further comprises a load carrying structure extending transverse to the vertical direction. The load carrying structure is carried by the tower and is arranged to carry at least two energy generating units.

BACKGROUND OF THE INVENTION

Wind turbines normally comprise one or more energy generating units. Each of the energy generating units comprises a hub carrying one or more wind turbine blades. The wind acts on the wind turbine blades, thereby causing the hub to rotate. The rotational movements of the hub are transferred to a generator, either via a gear arrangement or directly, in the case that the wind turbine is of a so-called direct drive type. In the generator, electrical energy is generated, which may be supplied to a power grid.

Some wind turbines are provided with two or more energy generating units in order to increase the total power produced by the wind turbine, without having to provide the wind turbine with one very large, and therefore heavy, energy generating unit. Such wind turbines are sometimes referred to as 'multirotor wind turbines'.

Traditional horizontal axis wind turbines sometimes use a hatch in the floor of the energy generating unit as an escape passage for fast evacuation of personnel. In a multirotor wind turbine, this is not always an optimal solution.

DESCRIPTION

It is an object of embodiments of the invention to provide a multirotor wind turbine with improved escape capabilities.

According to a first aspect, the disclosure provides a multirotor wind turbine comprising:
- a tower extending in a vertical direction from a tower bottom to a tower top, and
- at least two energy generating units, each energy generating unit holding a rotor arranged to rotate a drive train and each energy generating unit comprising a nacelle forming an interior space for the drive train,
- a load carrying structure extending transverse to the vertical direction, the load carrying structure being carried by the tower and arranged to carry the at least two energy generating units, and
- at least one escape route extending between a start and an exit.

The load carrying structure forms at least a first section of the escape route from the start to an intermediate location, and the wind turbine further comprises an escape opening in the nacelle, the escape opening leading from the interior space to a passage structure and the passage structure extending from the escape opening to the start of the escape route.

The load carrying structure is configured to carry the energy generating units and it is therefore typically relatively rigid and strong. Since at least a first section of the escape route is formed by the load carrying structure, increased safety can be obtained in escape procedures.

The nacelle may, in one embodiment, be tubular, and in another embodiment, it may be box shaped and form a sidewall extending between a bottom and a roof.

The escape opening could e.g. be in the roof, and the passage structure could extend from the roof along the sidewall. The roof may e.g. have a forward half portion towards the rotor and a rearward half portion away from the rotor, and the escape opening could be in the forward half portion of the roof.

The escape opening could e.g. be in the sidewall, and the passage structure could extend from the escape opening along the sidewall.

The escape opening could e.g. be in the bottom, and the passage structure could extend from the bottom along the sidewall.

In the present context, the term "escape route" should be interpreted to mean a passage allowing the personnel working in or near an energy generating unit to escape from the wind turbine to the exit. Escape could be necessitated by an incident, e.g. fire or explosion etc.

The exit could be at the ground, i.e. at the tower bottom where the escaping personnel can leave the wind turbine, or it could be at a working surface of a safety platform where the personnel can be picked up by a helicopter. The escape route could be partly or completely sheltered, e.g. by the structure of the wind turbine. In one such example, the escape route or at least a part of the escape route extends inside the load carrying structure or inside the tower. The escape route could also be sheltered by a shelter structure e.g. in the form of a roof. The escape route could also be non-sheltered, i.e. extend uncovered. The escape route may include rails and/or fastening means for securing the personnel. An example of such fastening means is a safety line attached between the person and a rail such that the safety line can run along the rail.

In the present context, the term "escape opening" should be interpreted as any opening having a size and shape allowing a person to exit the nacelle. The opening could be covered by a removable closure. The escape opening may include powered means for automatic opening of the closure. The wind turbine may e.g. comprise a sensor configured to provide a sensor signal in response to smoke, high temperatures, loud noise and to open the closure based on the signal.

In the present context, the term 'passage structure' should be interpreted to mean a traditional ladder, a rope ladder, a step structure provided in the sidewall, or any similar kind of structure allowing safe climbing or stepping along an outer surface of the nacelle. It could e.g. be a chute, a slide way, or a slide pole etc. An exterior structure may be defined on the outside of the nacelle that supports a permanent regular access way suitable for escaping the wind turbine, e.g. in the form of a pick-up platform, a ladder, a fall protection layer etc.

In one embodiment, the escape opening is in the bottom, i.e. in the floor of the nacelle, and the passage structure is constituted by a pick-up platform below the nacelle and located at the opening to allow access to the start of the escape route from the nacelle via the opening in the bottom.

In the present context, the term 'multirotor wind turbine' should be interpreted to mean a wind turbine comprising two or more energy generating units mounted to or on one tower.

In the present context the term 'energy generating unit' should be interpreted as a nacelle, a rotor with blades, and a drive train. The drive train may optionally include a shaft connecting the rotor to a generator, and optionally also include a gearbox between the rotor and the generator. In a direct driven wind turbine, the drive train may only be constituted by the rotor part of the generator. Parts of the drive train are typically inside the nacelle. According to the invention, at least a part of an energy generating unit is attached to the frame. This part could e.g. be the nacelle including or excluding the drive train inside the nacelle, the rotor including or excluding the blades, or it could be the complete energy generating unit.

By definition herein, the direction facing the front of the rotor plane, i.e. the direction of the wind is called downstream direction, and the opposite direction from the nacelle towards the rear of the rotor plane is called upstream direction.

The energy generating unit could be configured to face the rotor plane against the wind, i.e. a so called upstream unit or it could be configured to face the nacelle against the wind and the rotor away from the wind, i.e. a so called downstream unit.

In the present context, the term 'tower' should be interpreted to mean a substantially vertical structure, arranged to carry the energy generating units of the multirotor wind turbine via at least one load carrying structure. The tower may form an internal tower passage between the tower top and the tower bottom and having a size allowing personnel to escape through the internal tower passage.

The load carrying structure is carried by the tower, and the section of the escape route formed by the load carrying structure extends between the start and the intermediate location. The intermediate location could be at or in the internal tower passage, and the internal tower passage could form a second section of the escape route from the intermediate location to the exit.

In addition to the claimed load carrying structure with at least one energy generating unit, one or more additional energy generating units may be mounted directly on the tower. The tower may comprise a number of tower segments, which are assembled to form the tower.

A single tower may carry one, two, or more load carrying structures. Each load carrying structure may be supported by one or more towers, e.g. arranged such that more towers are connected by a load carrying structure extending between the towers.

Each load carrying structure may carry at least two energy generating unit, e.g. three, four, five or six energy generating units. For this purpose, the load carrying structure may e.g. have a triangular, quadrangular, pentagonal or hexagonal outer contour, or it may stretch out far from the tower in different directions and have several energy generating units attached in rows extending away from the tower.

The load carrying structure may comprise:
a first load carrying arrangement extending outwards on a left side of the tower; and
a second load carrying arrangement extending outwards on a right side of the tower.

Each load carrying arrangement may comprise a primary structure attached to the tower in a lower interface and may extend between the lower interface and a corresponding one of the at least two energy generating units.

The load carrying arrangement may further comprise a tension arrangement comprising at least one secondary structure attached to the tower in an upper interface and extending above the primary structure between the upper interface and the corresponding one of the at least two energy generating units such that gravity acting on the energy generating units causes compression of the primary structure and tension in the at least one secondary structure. In this embodiment, the escape route, i.e. the first section of the escape route, may particularly extend along a selected one of the secondary structures.

Since the secondary structures are tension structures, the risk of collapse of the secondary structures e.g. in case of fire, is lower than the corresponding risk of collapse of the primary structure which is under compression. Further, since the secondary structure extends above the primary structure, they are less prone to become damaged by items falling down during an incident.

The second structure may be constituted e.g. by cables or rods etc.

The tower may include a yaw arrangement which includes a yaw bearing, e.g. in the form of a tubular element rotationally arranged about the outer surface of a part of the tower. The lower and upper interfaces could be on this yaw bearing thereby allowing the load carrying structure to rotate relative to the tower. The escape route may therefore intersect the yaw bearing in a transition from the load carrying structure to the tower. For that purpose, the yaw bearing may form a passage for personnel to pass across the yaw bearing.

If the yaw bearing is constituted by a tubular element rotationally arranged about the tower, the tubular element may comprise a yaw-opening allowing personnel to enter into an intermediate space between the tubular element and the outer surface of the tower, and the tower may likewise comprise an opening for entering from the intermediate space into the internal tower passage.

The escape route may include a trolley structure configured to move personnel quickly and precisely along a track from one point to another point within the escape route. The trolley structure may e.g. form a cabin for personnel to be rescued, or the person to be rescued could be suspended from and pushed/pulled trough the escape route by use of the trolley.

The trolley structure may move along a dedicated beam structure made for the purpose of carrying the trolley. Such a dedicated beam structure may extend from the start to the exit or it may extend between points between the start and exit.

In one embodiment, trolley structure is configured to be movable along the secondary structure.

The trolley could include power means for effecting the movement, e.g. battery powered or spring powered power means which are not depending on external power supply in case of an accident.

The trolley may include fastening means e.g. in the form of safety lines attachable between the person and the trolley structure. By use of the trolley structure, the escaping person can be moved to the upper interface where the secondary structure is attached to the tower. From this point, the escape route may extend either upwardly towards a safety platform or downwardly along, or inside the internal tower passage to the ground.

The tension arrangement may comprise:
a forward secondary structure attached to the tower in a forward point of the upper interface and extending above the primary structure between the forward point and the corresponding one of the at least two energy generating units, and
a rearward secondary structure attached to the tower in a rearward point of the upper interface and extending above the primary structure between the rearward point and the corresponding one of the at least two energy generating units.

The forward point and the rearward point are on opposite sides of a plane through the right side or left side of the tower, where the forward point is closer to the rotor than the rearward point, and where the selected secondary structure extends to the rearward point.

When the selected secondary structure is the structure which extends to the rearward point, the escape route extends at a larger distance from the rotating blades of the wind turbine. This may increase safety further.

The wind turbine may further comprise a safety platform, where the safety platform is carried at the tower top, and where the escape route extends from the interior space to the safety platform. In this embodiment, the safety platform may form the exit.

The safety platform forms an upward working surface from which the escaping personnel can be picked up by a helicopter or a drone.

When the safety platform is remote from the energy generating unit, the risk of collision between the rotor and escaping personnel is reduced. Further, the risk of fire, explosion, or other potentially hazardous malfunctioning of the wind turbine is higher in, or near, the energy generating unit, and when the safety platform is remote from the energy generating unit, it increases the safety when using the escape route and when using the safety platform to exit the wind turbine.

The working surface may particularly be formed as hoisting platform with an area which is at least 1-2 square meters large to enable hoisting of a person by cable from a helicopter or drone. Such a safety platform may have a surrounding fence The working surface may alternatively be formed as a landing platform with an area of at least 10 square meters and not having an upwards fence but rather an outwards or slightly downwards safety net surrounding the working surface.

The safety platform may also include a reconfigurable fence having at least a lowered and a raised configuration where the fence projects over the working surface in the raised configuration and is at, or below the working surface in the lowered configuration. In that way, the safety platform can change between being suitable for hoisting persons and being suitable as a landing platform.

The primary structure may be constituted by a tubular element forming an internal primary structure passage extending between the energy generating unit and the tower, and e.g. leading into the internal tower passage. In this embodiment, the escape route, i.e. the first section of the escape route, may particularly extend through the internal primary structure passage.

The internal primary structure passage may include means for moving personal through the passage, e.g. including a chute, a conveyor, or trolley, or other means for transportation.

The internal primary structure passage may further include a supply unit containing safety equipment for personnel protection in an emergency situation.

The primary structure may comprise an opening, herein referred to as "primary structure opening", allowing entrance into the internal primary structure passage. The primary structure opening could be provided at or near the energy generating unit. In one embodiment, the opening is inside the energy generating unit, and in another embodiment, the opening is next to the energy generating unit. In case of the latter, the escape route may extend from inside the nacelle, through the escape opening, e.g. in the roof, along the passage structure to the primary structure through the opening into the internal primary structure passage, through the internal primary structure passage into the internal tower passage, and via the internal tower passage down to the ground or up to a safety platform.

The primary structure may form an essentially plane pick-up platform around the primary structure opening and the passage structure may extend from the escape opening to the pick-up platform.

In one embodiment, the wind turbine comprises a fire-bulkhead arranged in the internal primary structure passage and separating the internal primary structure passage into a forward portion and a rearward portion, the forward portion extending below the energy generating unit and the rearward portion extending from the fire-bulkhead to the tower and optionally into the internal tower passage. The primary structure opening may extend into the rearward portion such that the escape route extends through the rearward portion of the internal primary structure passage. This protects the escape route from fire in the forward portion, e.g. caused by fire in or near the energy generating unit. The fire bulkhead may also prevent fire spreading from the nacelle into the rearward portion of the internal primary structure passage, e.g. caused by burning oil flowing in the passage.

The fire-bulkhead may have an opening allowing passage of persons and materials. The opening may be normally closed or normally open. If normally open it may include means for automatically closing the opening in case of a fire alarm etc.

In one embodiment, the wind turbine comprises at least two escape routes.

In a first group of escape routes, the exit is at high altitude at a safety platform carried at or above the tower top. Examples of such escape routes are:

a) an escape route extending from one of, or from each of the energy generating units through the internal primary structure passage, through the internal tower passage to the tower top, and from the tower top to a safety platform.

b) an escape routes extending from one of, or from each of the energy generating units along one of the secondary structures to a safety platform.

c) an escape route extending from one of, or from each of the energy generating units along one of the secondary structures to a tower opening into the internal tower passage and through the internal tower passage to the tower top, and from the tower top to a safety platform.

In a second group of escape routes, the exit is at the ground at the tower bottom. Examples of such escape routes are:

d) an escape route extending from one of, or from each of the energy generating units through the internal primary structure passage, through the internal tower passage to the tower bottom at the ground.

e) an escape route extending from one of, or from each of the energy generating units along one of the secondary structures to a tower opening into the internal tower passage and through the internal tower passage to the tower bottom.

The wind turbine may comprise switchgear, power converter, and similar electrical components configured for connecting the generators of the energy generating units to a power grid. Herein the term "electrical connection equipment incudes converters, transformers, inverters, switch gear and peripheral equipment e.g. for cooling the aforementioned components.

In one embodiment, the multirotor wind turbine comprises one or more sets of electrical connection equipment at or just below the safety platform at the tower top. The multirotor wind turbine may e.g. comprise one set of electrical connection equipment for each energy generating unit, or it may comprise one mutual set of electrical connection equipment for all energy generating units.

The electrical connection equipment can be located in the tower below the safety platform, or the electrical connection equipment can be located outside the tower, e.g. suspended on the side of the tower, beneath the safety platform.

The location of the electrical connection equipment beneath the safety platform facilitates easy access to service and replacement by use of helicopters or drones, and the location at the top of the tower may increase safety and allow rescue of personnel to the ground in case of fire in the electrical connection equipment. Further, the location of the electrical connection equipment at the tower top may reduce electrical loss and provide a more efficient energy production. Additionally, the location at the tower top below the safety platform may increase balance in the tower and reduce the complexity and dimensions of the load carrying structure. Additionally, fire at the tower top typically spreads only slowly downwards through the tower or does not spread at all. That improves the options for personnel to escape through the exit at ground.

The rotor of the multirotor wind turbine may particularly comprise a set of rotor blades, particularly three blades. The wind turbine may further comprise a rotor locking structure configured to lock rotation of the rotor in a position where one blade extends in a direction from the energy generating unit towards a lower surface of the safety platform. e.g. pointing in a horizontal direction.

The multirotor wind turbine may particularly comprise a coordinating locking structure configured to operate on two adjacent energy generating units to lock the rotor of both units such that at least one blade of each unit points towards a blade of the other unit. This may particularly be a position where both blades are horizontal.

The locking of the blades may increase safety during a rescue operation e.g. by helicopter or drones from the safety platform.

The safety platform could be offset in a horizontal plane relative to tower in such a way that the safety platform is asymmetric relative to the tower top. By asymmetric is herein meant that the geometric centre of the safety platform is offset relative to the geometric centre of a cross section transverse to the tower top.

As a result of the asymmetry, a front point of the outer periphery of the safety platform may be behind the corresponding front point of the periphery of the tower top cross section in the direction from the rotor plane along the rotor axes and rearwards away from the rotor planes. The distance between the front points in the rearward direction could be anything above zero such as 10, 20, 30, 40, 50, 60 or more percent of the largest dimension of the platform.

An opposite asymmetry can also be applied, i.e. instead of the front point of the outer periphery of the safety platform being behind the corresponding front point of the periphery of the tower top cross section, the front point of the outer periphery of the safety platform could be in front of the corresponding front point of the periphery of the tower top cross section in the direction towards the rotor planes.

The offset could particularly be to the extent where the tower top is at least partly outside the outer contour of the safety platform when seen in a top view in the direction from the tower top to the tower bottom. The offset could particularly be to the extent where the centre of the safety platform is outside the outer contour of the tower top.

The offset may enable improved access to the internal tower passage and therefore improve safety. It may particularly be an offset in a direction away from the rotors to thereby further improve safety when using helicopters to rescue personnel from the safety platform.

In one embodiment, the wind turbine comprises an electronic escape control system comprising at least one alert sensor configured to provide a signal identifying an incident upon detection of smoke, high temperatures, or loud noise.

The electronic escape control system may comprise a processor and a number of alert signals controlled by the processor. The alert signals could be configured for audio or visual indication of an incident, and the alert signals could be signals which guides the personnel to select one out of several defined escape routes depending on a signal from one of the at least one sensors. In one embodiment, the electronic escape control system comprises a plurality of alert sensors each located in different defined escape routes. The processor could be configured, based on an alert signal received from one of the plurality of alert sensors to provide a risk factor of each of the escape routes relative to the other escape routes and to select a one of the escape routes to be recommended for escape from the wind turbine. Finally, the processor could be configured to present the selected escape route to the personnel via one of the alert signals, e.g. by stripes of light along the selected escape route.

In a second aspect, the disclosure provides a method for escaping from a power generating unit of a multirotor wind turbine according to the first aspect of the disclosure. According to this method, the power generating unit is evacuated via an escape route extending through the escape opening and via the passage structure. The method according to the second aspect may include the use of any of the features mentioned relative to the first aspect of the disclosure.

BRIEF DESCRIPTION OF THE DRAWINGS

The invention will now be described in further detail with reference to the accompanying drawings in which.

DETAILED DESCRIPTION OF THE DRAWINGS

Figure 1:
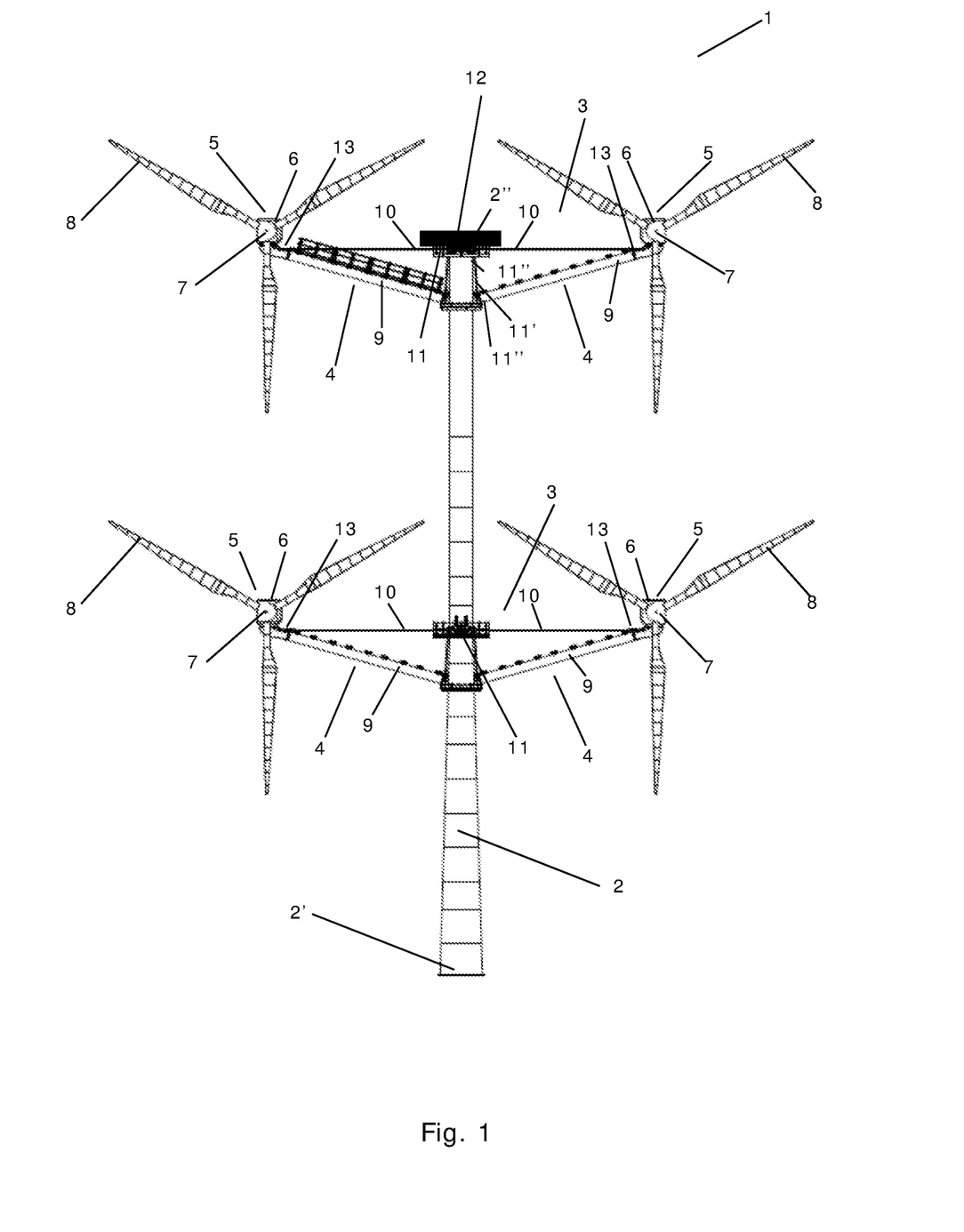
FIG. 1 is a front view of a multirotor wind turbine comprising two load carrying structures according to an embodiment of the invention.

FIG. 1 is a front view of a multirotor wind turbine 1 comprising a tower 2 carrying two load carrying structures 3 according to an embodiment of the invention. The load carrying structures 3 are arranged one above the other, along the length of the tower 2.

Each load carrying structure 3 comprises two load carrying arrangements 4, extending away from the tower 2 on opposite sides of the tower 2, as seen from the viewing angle of FIG. 1. Each load carrying arrangement 4 carries an energy generating unit 5, and each energy generating unit 5 comprises a nacelle 6 and a rotor 7 carrying three wind turbine blades 8.

Each load carrying arrangement 4 comprises a primary structure 9, in the form of a tube, and two secondary structures 10, in the form of double wires. In FIG. 1, only one of the secondary structures 10 for each load carrying arrangement 4 is visible.

The primary structures 9 extend away from the tower 2 along a direction which forms an acute angle with respect to a substantially vertical longitudinal axis defined by the tower 2. Thereby the primary structures 9 extend away from the tower 2 along an inclined upwards direction.

The secondary structures 10 extend away from the tower 2 along a direction which is substantially perpendicular to the substantially vertical longitudinal axis defined by the tower 2. Thereby the secondary structures 10 extend away from the tower 2 along a substantially horizontal direction. Accordingly, an angle is defined between the direction in which primary structure 9 of a given load carrying arrangement 4 extends, and the plane in which the secondary structures 10 of the load carrying arrangement 4 extend.

The primary structures 9 and the secondary structures 10 are attached to the tower 2 via a yaw arrangement 11, allowing the entire load carrying structure 3 to perform yawing movements with respect to the tower 2 in order to direct the rotors 7 into the incoming wind. The yaw arrangement comprises a yaw bearing in the form of a tubular element 11' which is arranged rotationally relative to the tower, and which encircles the outer surface of a part of the tower. The yaw arrangement 11 forms a lower and an upper interface 11" where the load carrying structure interfaces the tower. In this way, the load carrying structure is allowed to rotate relative to the tower. The escape route may intersect a space formed between the outer surface of the tower and the tubular element 11'. For that purpose, the tubular element 11' forms an opening allowing passage of personnel from the primary structure 9 into the tower.

The multirotor wind turbine further comprising a safety platform 12 forming an upwards facing plane working surface The primary structures 9 of a given load carrying structure 3 and the secondary structures 10 of the load carrying structure 3 are attached to the tower 2 at separate positions along the length of the tower 2.

When gravity acts on the energy generating units 5, the mutual positions of the primary structures 9 and the secondary structures 10 causes push in the primary structures 9 and pull in the secondary structures 10. Thereby a preload is introduced in the secondary structures 10, due to the gravity acting on the energy generating units 5.

During operation of the multirotor wind turbine 1, thrust forces will act on the energy generating units 5, in the direction of the incoming wind or in the opposite direction. When this occurs, the pull in one of the secondary structures 10 of each of the load carrying arrangements 4 is decreased while the pull in the other secondary structure 10 is increased. However, the preload introduced in the secondary structures 10, due to gravity acting on the energy generating units 5, is sufficiently high to ensure that the secondary structure 10, in which the pull is decreased, remains tight. Accordingly, the load carrying structure 1 is capable of handling the thrust forces introduced during operation of the multirotor wind turbine 1.

The wind turbine illustrated in FIG. 1 forms three different escape routes. All three escape routes extend from the nacelle 6 through an escape opening in the roof of the nacelle, along a passage structure along the sidewall to a pick-up platform 13 at the primary structure.

From the pick-up platform, a first one of the three escape routes extends through a primary structure opening configured for entrance of personnel into an internal primary structure passage extending inside the primary structure. The internal primary structure passage communicates with an internal tower passage and allows escape through the tower to the safety platform 12 or to the tower bottom 2'.

From the pick-up platform, a second one of the three escape routes extends through on the primary structure, but outside the primary structure along an outer passage protected by the fence 14. This is only illustrated on one of the primary structures, but it could be implemented on all primary structures. From the outer passage, the personnel may enter the internal tower passage via a hatch in the tower and escape through the tower to the safety platform 12 or to the tower bottom 2'.

From the pick-up platform, a third one of the three escape routes extends through along one of the secondary structures 10. If one of the lower energy generating units is escaped, the personnel may enter from the secondary structure into the internal tower passage via a hatch in the tower and escape through the tower to the safety platform 12 or to the tower bottom 2'. If one of the upper energy generating units is escaped, the personnel may enter from the secondary structure directly onto the safety platform 12, or optionally, the personnel may continue from the safety platform 12 through the internal tower passage to the tower bottom 2'.

Figure 2:
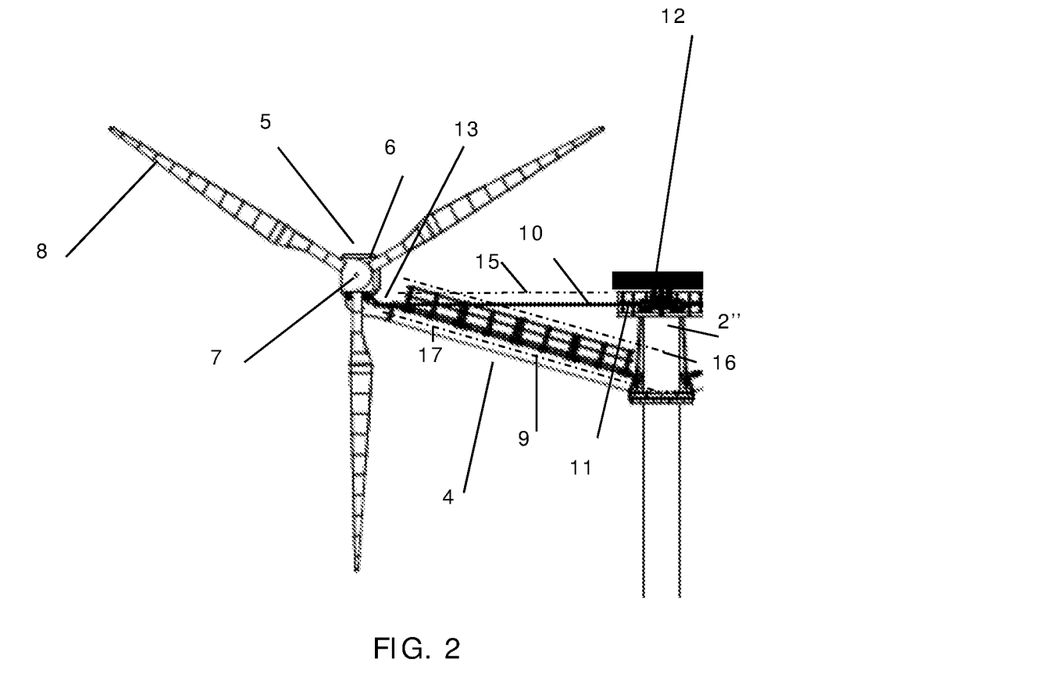
FIG. 2 is an enlarged view of one of the energy generating units in FIG. 1 including further details.

FIG. 2 illustrates an enlarged view of one of the energy generating units 5 carried by a first load carrying arrangement 9, 10. In this view, the dotted line 15 illustrates a first escape route along one of the secondary structures by use of a trolley movable directly between the energy generating unit 5 and the safety platform 12. The dotted line 16 illustrates a second escape route along the outer surface of the primary structure 9 to a hatch opening in the tower. The hatch opening allows entrance into the internal tower passage through which the escaping person can move upwardly to the safety platform 12 or downwardly to the tower bottom 2'. The dotted line 17 illustrates a passage through the internal primary structure passage from a primary structure opening at the energy generating unit down to the tower, and into the internal tower passage.

Figures 3, 4:
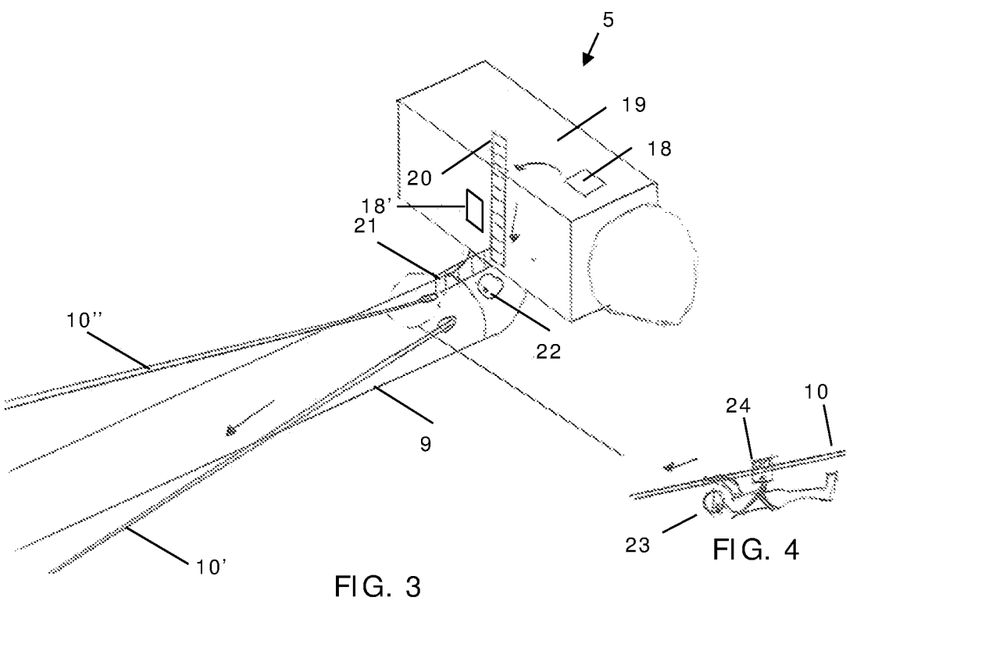
FIG. 3 is a perspective view of one of the energy generating units.
FIG. 4 illustrates an escaping person using a trolley along a secondary structure.

FIG. 3 illustrates an enlarged view of one of the energy generating units 5, including the escape opening 18 in the roof of the nacelle 19, and the passage structure 20 extending along the sidewall to a pick-up platform 21. The nacelle includes another escape opening 18' in a sidewall. This escape opening allows sideways exit from the nacelle and escape along the passage structure 20 to the start of the escape route.

FIG. 3 further illustrates a primary structure opening 22 leading into an internal primary structure passage extending inside the primary structure and being connected to the internal tower passage.

Each load carrying arrangement 4 comprises two secondary structures 10', 10", extending on opposite sides of the primary structure 9 from the energy generating unit 5 to respective attachment points at the tower top 2". 8. I.e. the wind turbine comprises a forward secondary structure 10' attached to the tower in a forward point of the upper interface and extending above the primary structure 9 between the forward point and the corresponding one of the at least two energy generating units 5, and a rearward secondary structure 10" attached to the tower in a rearward point of the upper interface and extending above the primary structure 9 between the rearward point and the corresponding one of the at least two energy generating units 5. The forward point and the rearward point are on opposite sides of the right side or left side of the tower, and the forward point is closer to the rotor than the rearward point. In this embodiment, the selected secondary structure which is used for the escape route extends to the rearward point. This is illustrated in FIG. 4, where the rearward secondary structure 10" is used in combination with a trolley attached to a person 23 escaping from the pick-up platform 21.

Figure 5:
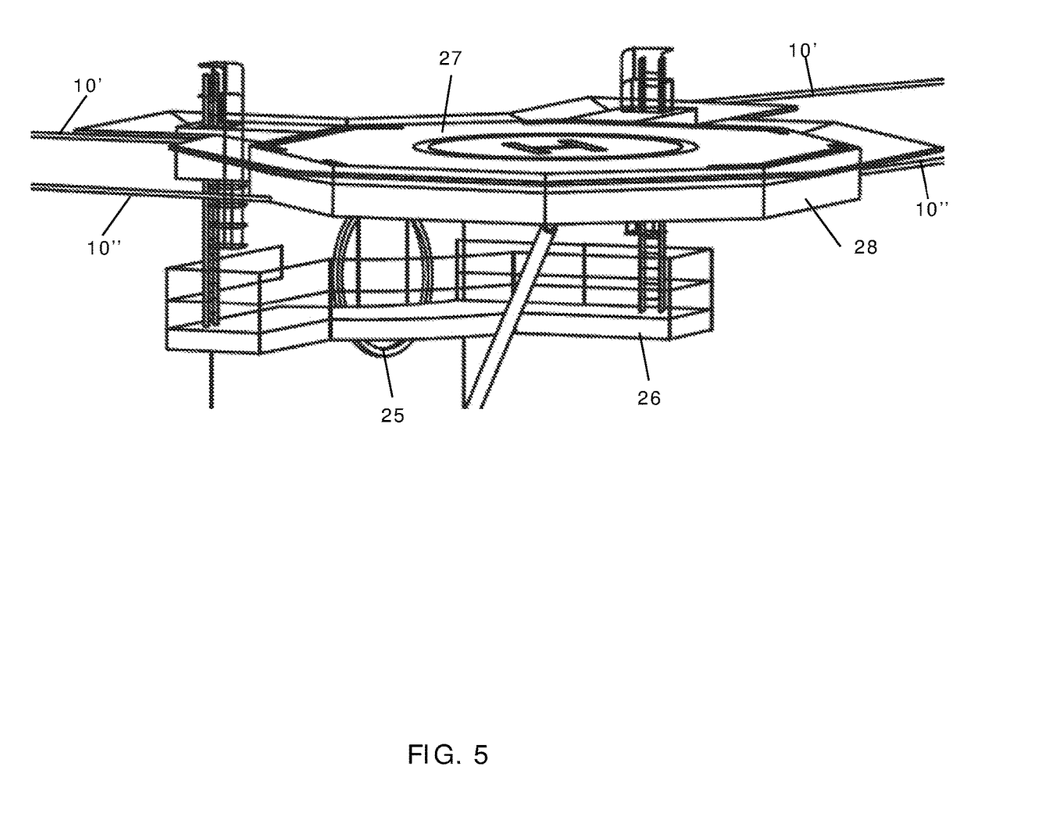
FIG. 5 illustrates details of a safety platform at which two different escape routes terminate, FIG. 6 outlines the contour of a wind turbine with different escape routes.

FIG. 5 illustrates further details of a portion of two different escape routes. One of the escape routes extends through the internal tower passage to a tower top opening 25 into an access bridge 26. The tower top opening 25 allows entrance from the tower to the access bridge 26, and from the access bridge, the escaping person can enter the working surface 27 of the safety platform 28 where the escape can be completed by helicopter. Another of the two routes extends via one of the secondary structures 10 directly onto the working surface 27 of the safety platform 28 by use of the trolley 24 shown in FIG. 4.

Figure 6:
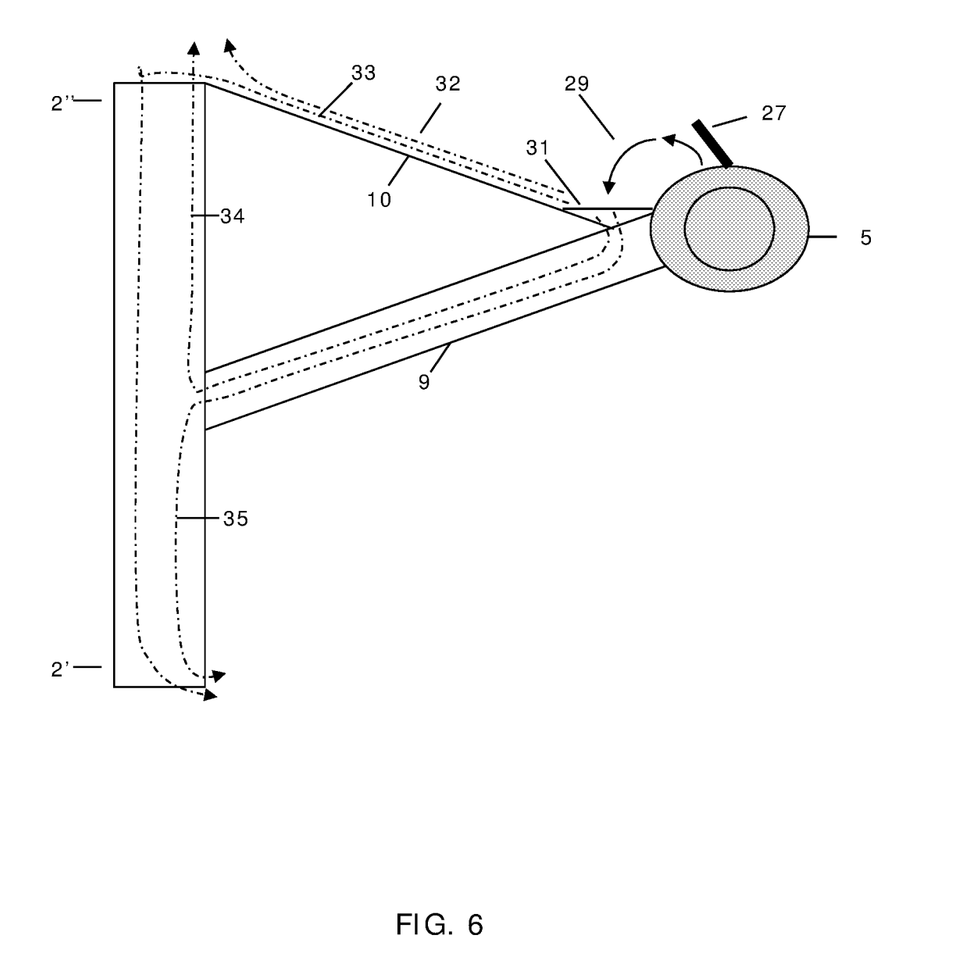

FIG. 6 outlines the contour of a wind turbine where the nacelle is tubular. The arrow 29 illustrates the location of the passage structure from the escape opening at the open hatch 30 to the pick-up platform 31 forming the start of the escape route, and the arrows 32, 33, 34, 35 indicate four different escape routes, where routes 32, 34 have an exit at the tower top 2", and routes 33, 35 have an exit at the tower bottom 2'.

Figure 7:
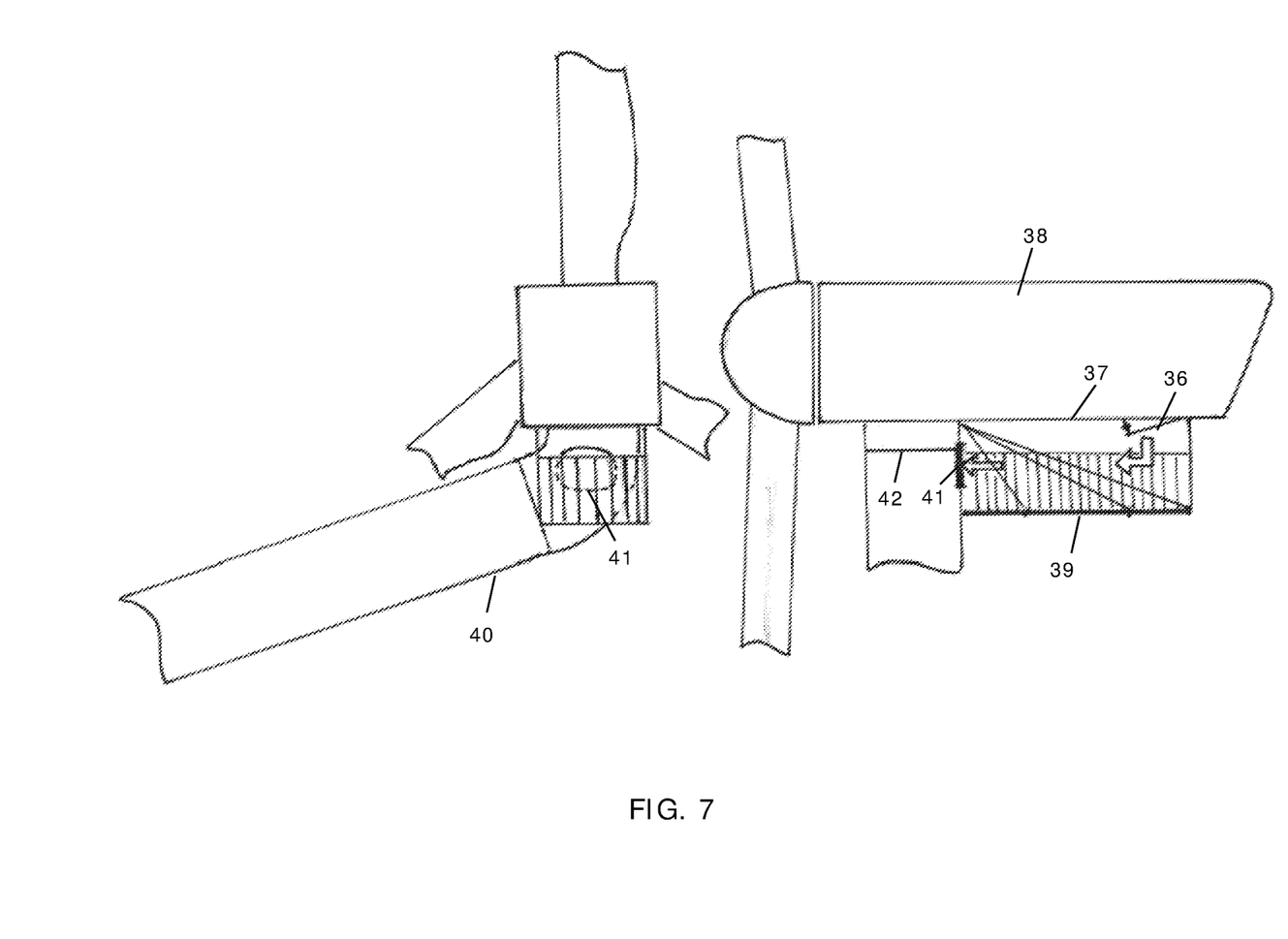
FIG. 7 illustrates a specific embodiment of the passage structure in the form of a pick-up platform connecting an opening in the nacelle with an opening in the primary structure.

FIG. 7 illustrates an embodiment where the escape opening 36 is in the bottom 37, i.e. in the floor of the nacelle 38. The passage structure is constituted by the pick-up platform 39 which is located below the nacelle directly beneath the opening 36.

In the illustrated embodiment, the load carrying structure comprises a primary structure 40 configured to absorb compression. In practise, the primary structure could be a tubular element of steel etc.

The primary structure comprises a primary structure opening 41 which defines the start of the escape route. The primary structure opening is sized to allow entrance of personnel into an internal primary structure passage extending inside the primary structure from the start to an intermediate location being at the tower. At the tower, the escape route extends through a yaw bearing and into the tower, and via an internal tower passage to the top or bottom of the tower.

A fire-bulkhead 42 is arranged in the internal primary structure passage between the nacelle and the primary structure opening 41. The bulkhead separates the internal primary structure passage and defines a rearward portion extending from the fire-bulkhead to the tower. This part is separated from fire which may occur in the nacelle.

Personnel are allowed to exit the nacelle through the opening and access the pick-up platform, and to reach the start of the escape route from the pick-up platform.

The wind turbine may additionally comprise secondary structures extending from the end of the primary structure where the energy generating unit is attached.

The secondary structures extend to a point at the tower, e.g. near the top of the tower.

The secondary structures may be configured for tension, and in practise they could be constituted by rods or cables, e.g. steel wires.

The escape route may include a well defined path along one or more of the secondary structures. The escape route may e.g. be well defined by the inclusion of a trolley structure movable along one or more of the secondary structures.

Figure 8:
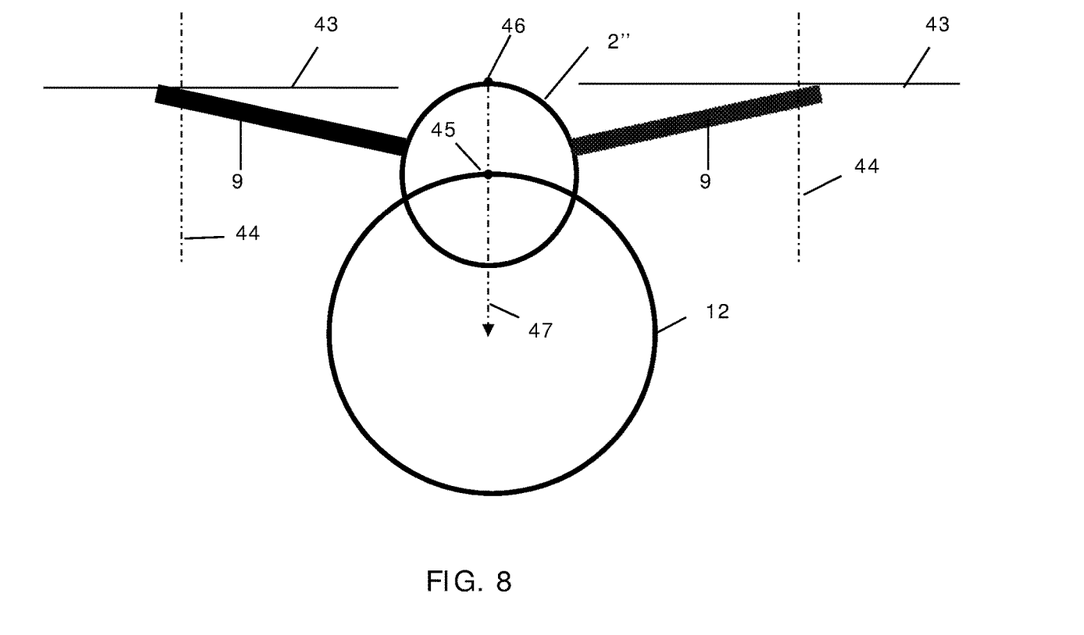
FIGS. 8 and 9 illustrate details of asymmetry between the tower cross section and the safety platform.
Figure 9:
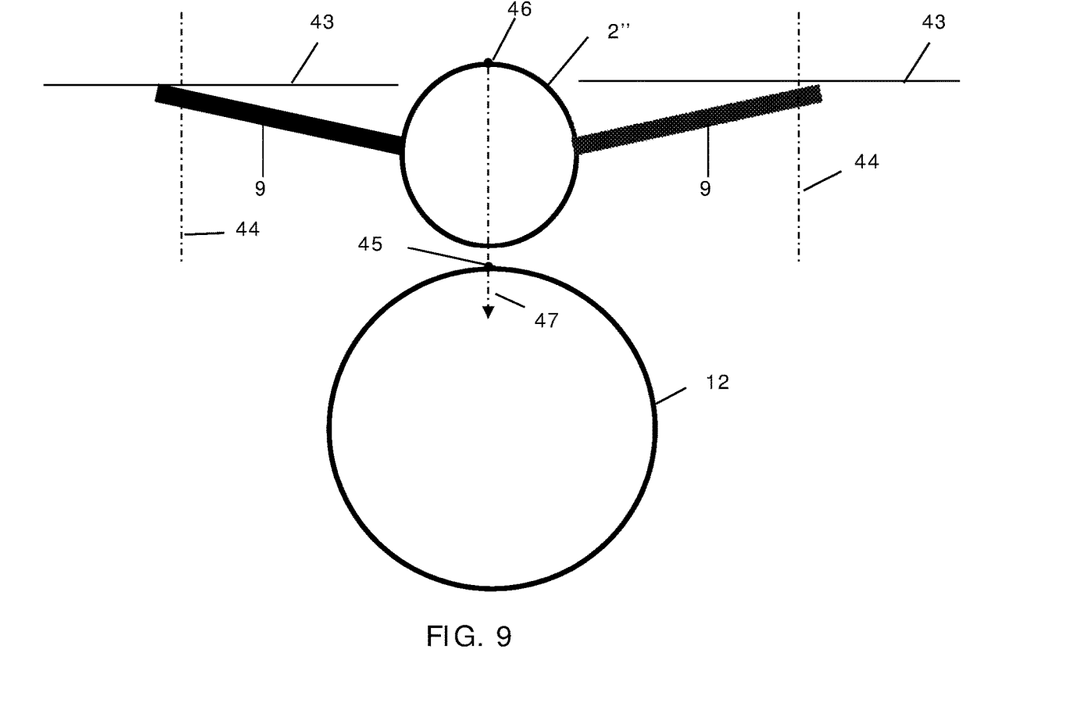

FIGS. 8 and 9 illustrate details of asymmetry between the tower cross section and the safety platform. Both FIG. 8 and FIG. 9 illustrate the wind turbine seen from above and FIG. 8 illustrates an embodiment where the contour of the safety platform 12 overlaps the contour of the tower top 2". FIG. 9 illustrates an embodiment where the contour of the safety platform 12 does not overlap the contour of the tower top 2".

The illustrated wind turbine has blades forming a rotor plane 43 by rotation of blades around the rotor axes 44, and in both embodiments the safety platform 12 is asymmetric in the direction away from the rotor planes 43, and in both embodiments, the platform 12 is completely within the borders defined on right and left sides by the rotor axis 44.

The safety platform 12 is asymmetric relative to the tower top 2" which means that the geometrical centre of the safety platform 12 is shifted relative to the geometric centre of the cross section of the tower top.

In both FIGS. 8 and 9, a front point 45 of the outer periphery of the safety platform 12 is behind the corresponding front point 46 of the periphery of the tower top cross section in the direction of the arrow 47, i.e. in the direction from the rotor plane 43 along the rotor axes 44 and rearwards. The distance between the front points 45 and 46 in the direction of the arrow 47 could be anything above zero such as 10, 20, 30, 40, 50, 60 or more percent of the largest dimension of the platform.

An opposite asymmetry can also be applied, i.e. instead of the front point 45 of the outer periphery of the safety platform 12 being behind the corresponding front point 46 of the periphery of the tower top cross section in the direction of the arrow 47, the front point 45 of the outer periphery of the safety platform 12 is in front of the corresponding front point 46 of the periphery of the tower top cross section in the direction opposite the arrow 47. Again, the distance between the front points 45 and 46 in the direction opposite the arrow 47 could be anything above zero such as 10, 20, 30, 40, 50, 60 or more percent of the largest dimension of the platform.

The invention claimed is:

1. A multirotor wind turbine comprising:
   a tower extending in a vertical direction from a tower bottom to a tower top;
   at least two energy generating units, each energy generating unit holding a rotor arranged to rotate a drive train and each energy generating unit comprising a nacelle forming an interior space for the drive train, the nacelle forming a bottom, a roof, and a sidewall extending between the bottom and the roof;
   a load carrying structure extending transverse to the vertical direction and carried by the tower, the load carrying structure arranged to carry the at least two energy generating units; and
   at least one escape route extending between a start and an exit,
   wherein the load carrying structure forms at least a first section of the escape route from the start to an intermediate location, and wherein the wind turbine further comprises at least one escape opening in the nacelle, the at least one escape opening leading from the interior space to at least one passage structure and the at least one passage structure extending from the at least one escape opening to the start of the at least one escape route, and
   wherein the at least one escape opening incudes a first opening in the bottom of the nacelle and the at least one passage structure includes a first passage structure that extends from the bottom of the nacelle along the sidewall of the nacelle.

2. The multirotor wind turbine according to claim 1, wherein the at least one escape opening incudes a second opening in the roof of the nacelle and the at least one passage structure includes a second passage structure that extends from the roof of the nacelle along the sidewall of the nacelle.

3. The multirotor wind turbine according to claim 2, wherein the roof has a forward half portion towards the rotor and a rearward half portion away from the rotor, and wherein the second escape opening is in the forward half portion of the roof.

4. The multirotor wind turbine according to claim 1, wherein the at least one escape opening incudes a second opening in the sidewall of the nacelle and the at least one passage structure includes a second passage structure that extends from the second escape opening along the sidewall of the nacelle.

5. The multirotor wind turbine according to claim 1, wherein the at least one escape opening incudes a second opening in the sidewall of the nacelle, and the at least one passage structure includes a second passage structure constituted by a pick-up platform outside the nacelle and located at the second opening to allow entrance from the nacelle to a safety platform.

6. The multirotor wind turbine according to claim 1, wherein the first passage structure is constituted by a pick-up platform below the nacelle and located at the first opening to allow access to the start of the escape route from the nacelle via the first opening in the bottom of the nacelle.

7. The multirotor wind turbine according to claim 1, wherein the load carrying structure comprises:
a first load carrying arrangement extending outwards on a left side of the tower; and
a second load carrying arrangement extending outwards on a right side of the tower;
each load carrying arrangement comprising a primary structure attached to the tower in a lower interface and extending between the lower interface and a corresponding one of the at least two energy generating units and a tension arrangement, the tension arrangement comprising at least one secondary structure attached to the tower in an upper interface and extending above the primary structure between the upper interface and the corresponding one of the at least two energy generating units such that gravity acting on the energy generating units causes compression of the primary structure and tension in the at least one secondary structure.

8. The multirotor wind turbine according to claim 7, wherein the at least one escape route extends along a selected one of the secondary structures.

9. The multirotor wind turbine according to claim 8, wherein the at least one escape route includes a trolley structure movable along the selected secondary structure.

10. The multirotor wind turbine according to claim 7, wherein the tension arrangement comprises:
a forward secondary structure attached to the tower in a forward point of the upper interface and extending above the primary structure between the forward point and the corresponding one of the at least two energy generating units, and
a rearward secondary structure attached to the tower in a rearward point of the upper interface and extending above the primary structure between the rearward point and the corresponding one of the at least two energy generating units,
where the forward point and the rearward point are on opposite sides of the right side or left side of the tower, where the forward point is closer to the rotor than the rearward point, and where the selected secondary structure extends to the rearward point.

11. The multirotor wind turbine according to claim 1, further comprising a safety platform, where the safety platform is carried at the tower top, and where the safety platform forms the exit.

12. The multirotor wind turbine according to claim 7, wherein the primary structure comprises a primary structure opening at the start, the primary structure opening configured for entrance of personnel into an internal primary structure passage extending inside the primary structure, and wherein the at least one escape route extends through the primary structure opening and through the internal primary structure passage.

13. The multirotor wind turbine according to claim 12, comprising a fire-bulkhead arranged in the internal primary structure passage and separating the internal primary structure passage into a forward portion and a rearward portion, the forward portion extending below one of the at least two energy generating units and the rearward portion extending from the fire-bulkhead to the tower.

14. The multirotor wind turbine according to claim 13, wherein the rearward portion extends into an internal tower passage extending inside the tower from the tower top to the tower bottom.

15. The multirotor wind turbine according to claim 12, wherein the primary structure opening extends into the rearward portion.

16. The multirotor wind turbine according to claim 1, wherein the at least one escape route includes at least two escape routes.

17. The multirotor wind turbine according to claim 1, comprising an electronic escape control system comprising at least one alert sensor configured to provide an alert signal upon detection of smoke, high temperatures, or loud noise.

18. The multirotor wind turbine according to claim 16, wherein the electronic escape control system comprises a processor and a number of alert sensors each configured to provide an alert signal upon detection of smoke, high temperatures, or loud noise, the alert sensors being located in different escape routes and wherein the processor is configured to communicate with the plurality of alert sensors and to select a recommended escape route between the at least two escape routes based on at least one alert signal from at least one of the alert sensors.

19. A method for escaping from a power generating unit of a multirotor wind turbine according to claim 1, wherein the power generating unit is evacuated via the at least one escape route extending through the at least one escape opening and via the at least one passage structure.

* * * * *